United States Patent [19]

Saito

[11] 4,268,881
[45] May 19, 1981

[54] AZIMUTH ADJUSTING DEVICE FOR MAGNETIC HEAD

[75] Inventor: Shoichi Saito, Tokyo, Japan

[73] Assignee: Olympus Optical Co., Ltd., Tokyo, Japan

[21] Appl. No.: 48,386

[22] Filed: Jun. 14, 1979

[30] Foreign Application Priority Data

Jun. 15, 1978 [JP] Japan .................... 53-82114[U]

[51] Int. Cl.³ ............................................. G11B 21/24
[52] U.S. Cl. ................................................. 360/109
[58] Field of Search ..................................... 360/109

[56] References Cited

U.S. PATENT DOCUMENTS 3,794,769 2/1974 Neff .................................. 360/109
4,158,212 6/1979 Dattilo ............................. 360/109
4,158,868 6/1979 Jenkins ............................ 360/109

Primary Examiner—Robert S. Tupper
Attorney, Agent, or Firm—Toren, McGeady and Stanger

[57] ABSTRACT

An azimuth adjusting device for a magnetic head includes a head fitting plate for supporting a magnetic head, an azimuth adjusting screw, and a gear wheel having a relatively large diameter provided on the head portion of the azimuth adjusting screw. A desired amount of rotation can be transmitted to the screw through the gear wheel, and the rotational angle of the screw can be finely adjusted by way of another gear wheel which meshes with the gear wheel on the adjusting screw.

4 Claims, 4 Drawing Figures

AZIMUTH ADJUSTING DEVICE FOR MAGNETIC HEAD

BACKGROUND OF THE INVENTION

The present invention relates to an azimuth adjusting device for a magnetic head. The device can carry out azimuth adjustment of the magnetic head with high precision.

In tape recorders and the like, the inclination of a magnetic head relative to the tape, i.e., azimuth adjustment, is most important to obtain recording or reproduction of good quality.

Particularly, in present day super-miniature tape recorders, in order to obtain long recording times, the tape speed is set extremely slow. Thus, in order to improve recording density for carrying out recording and reproduction of good quality with the slow moving tape, it becomes all the more important to make the azimuth adjustment error extremely small.

In conventional azimuth adjusting devices, as shown in FIGS. 1a and 1b, the inclination of a head fitting plate 5 which supports a magnetic head 4 is adjusted by a pair of adjusting screws 2, 3 threaded in a substrate 1. That is, FIG. 1a shows that when one screw 2 is fixed and the other screw 3 is rotated, the inclination of the head fitting plate 5 is adjusted and an azimuth error $\theta_1$ of the head 4 is eliminated.

However, such construction cannot provide an azimuth adjustment of high precision for the reasons mentioned below.

That is, $\theta_1$ in case of an output 0 by an azimuth displacement is expressed by $$\tan\theta_1 = \lambda/W \tag{1}$$

wherein a recording wavelength is $\lambda$ and the track width of a tape is W.

In this case, the inclination of the head fitting plate 5 is equal to $\theta_1$, so that if a distance between the adjusting screws 2 and 3 is l and a height error caused by the inclination of the head plate 5 is S, the following is obtained.

$$\tan\theta_1 = S/l \tag{2}$$

Here, if the pitch of the adjusting screw 3 is P, and the rotational angle is $\theta_2$, it is expressed by $S = \theta_2 P$, so that from the equations (1) and (2), the following equation is obtained.

$$\lambda/W = \theta_2 P/l \tag{3}$$

Therefore, as apparent from the equation (3), in order to heighten the precision of the azimuth adjustment, it is preferable to make the distance l between the adjusting screws 2 and 3, i.e., the length of the head fitting plate 5, relatively large, or the pitch P of the adjusting screw 3 small. However, in actual super-miniature tape recorders, it is impossible to take sufficiently large space for the length of the head fitting plate 5, and there is also a limit to the extent the pitch P can be made small because of the dimensions of the screw.

As a result, if the recording wavelength $\lambda$ is made small for the purpose of increasing the recording density, the adjusting precision of the azimuth is largely controlled by the precision of adjustment of the rotational angle $\theta_2$ of the adjusting screw 3, since the track width W is constant.

However, in the construction shown in FIGS. 1a and 1b, the adjusting screw 3 is directly rotated to adjust the azimuth error, so that high precision can hardly be expected through adjustment of the rotational angle $\theta_2$ of the screw 3.

SUMMARY OF THE INVENTION

An object of the present invention is to eliminate the above described disadvantages of the conventional azimuth adjusting device for a magnetic head.

Another object of the present invention is to provide an azimuth adjusting device for a magnetic head, which can carry out azimuth adjustment of the magnetic head with high precision by fine adjustment of the rotational angle of an adjusting screw.

According to the present invention, an azimuth adjusting device for a magnetic head comprises a head fitting plate for supporting a magnetic head, an azimuth adjusting screw for adjusting the azimuth of the head, a gear wheel having a relatively large diameter provided on the head portion of the azimuth adjusting screw, a desired amount of rotation being transmitted to the screw through the gear wheel so that the rotational angle of the screw can be finely adjusted. The desired amount of rotation is transmitted to the gear wheel by an azimuth adjusting disc integral with another gear wheel of relatively small diameter which is geared with the gear wheel of larger diameter on the azimuth adjusting screw.

BRIEF DESCRIPTION OF THE DRAWINGS

FIG. 1b is a cross-sectional view of the device shown in FIG. 1a;

FIG. 2b is a partly cross-sectional view of the device shown in FIG. 2a.

DESCRIPTION OF THE PREFERRED EMBODIMENT

Figure 1A:
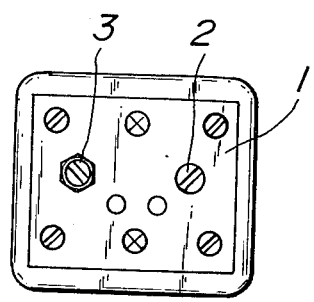
FIG. 1a is a plan view showing a conventional azimuth adjusting device.
Figure 1B:
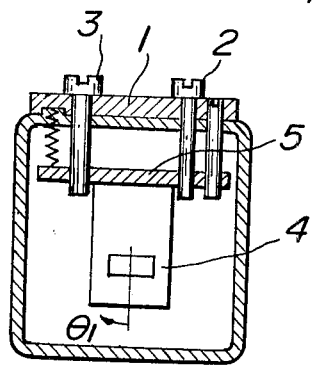
Figure 2A:
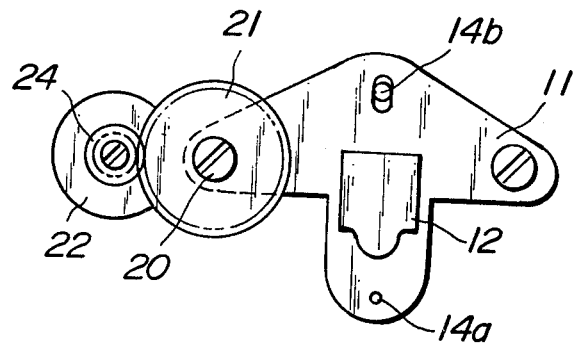
FIG. 2a is a plan view showing one embodiment of an azimuth adjusting device according to the present invention.
Figure 2B:
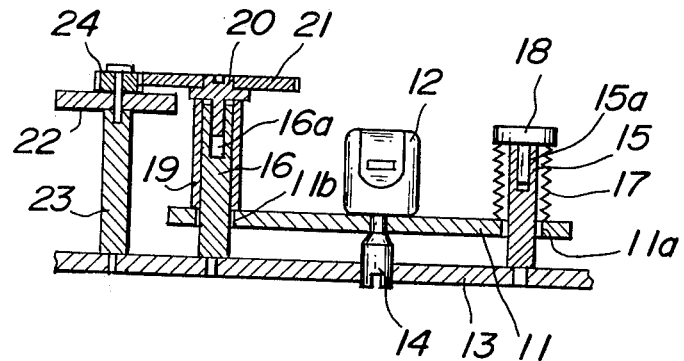

FIGS. 2a and 2b show one embodiment of an azimuth adjusting device according to the present invention.

FIGS. 2a and 2b includes; a head fitting plate 11 which is provided with a magnetic head 12 at the center of the plate surface. The plate 11 is generally T-shaped, and both ends of the upper bar of the "T" have through-holes 11a, 11b, respectively.

The head fitting plate 11 is placed on pins 14a and 14b supported on a play lever 13 interlocked with the recording, reproducing and stopping mechanisms of a tape player or recorder. Pins 14a and 14b are aligned to pivot the head fitting plate at points along a line parallel to the center axis of the magnetic head 12, so that the plate 11 is maintained parallel to the play lever 13 in the center axis direction of the magnetic head 12.

Further, into the through-holes 11a, 11b of the head fitting plate 11 are inserted pins 15 and 16 which are supported on the play lever 13. These pins 15 and 16 are provided with screw holes 15a and 16a at each end further from the play lever 13, respectively. One screw hole 15a of the pin 15 is provided with a screw 18 by interposing a spring 17 between the plate 11 and the screw 18, while the screw hole 16a of the other pin 16 is provided with an azimuth adjusting screw 20 by interposing a sleeve 19 between the plate 11 and the screw 20.

The screw 20 is integrally provided with a gear wheel 21 having a comparatively large diameter at the head portion. The gear wheel 21 may be detachable, as well. Further, an azimuth adjusting disc 22 is arranged close to the gear wheel 21. This disc 22 is supported for rotation about its axis by a shaft 23 which extends from the play lever 13. Further, the disc 22 is provided with an integral gear wheel 24 having a smaller diameter than the gear wheel 21 with which the gear wheel 24 is engaged. Rotation of the disc 22 is transmitted to the screw 20 through the gear wheels 24 and 21.

In this case, the azimuth adjusting disc 22 may be integrally formed with the gear wheel 24 and the shaft 23 as a detachable adjusting jig. In case such jig is used, the shaft 23 is inserted into a hole (not shown) on the play lever 13 so as to engage the gear 24 with the gear 21.

The action of the device constructed as described above will be explained as follows. First of all, the screw 18 of one pin 15 is fixed and one end of the head fitting plate 11 is supported through the spring 17.

When the azimuth adjusting disc 22 is rotated under this state, an amount of rotation is transmitted to the screw 20 through the gear wheels 24 and 21. Then, pressure on the other end of the head fitting plate 11 is adjustably applied through the sleeve 19 by rotation of the screw 20, and the inclination of the plate 11, i.e., the azimuth error $\theta_1$ of the head 12, is adjusted.

In this case, an amount of the rotation of the azimuth adjusting disc 22 is transmitted by gear wheel 24 to the adjusting screw 20 through the gear wheel 21 having a larger diameter than gear wheel 24, and the rotational angle of the adjusting screw 20 is determined. Therefore, even a small rotational angle of the adjusting screw 20 can be enlarged by the gear wheel 21, so that if an amount of the rotation of the disc 22 is lessened, the rotational angle of the adjusting screw 20 can finely be adjusted. This means that high precision can be expected in adjustment of the rotational angle $\theta_2$ in the above equation (3), thereby obtaining an azimuth adjustment of correspondingly high precision.

Accordingly, with such construction, azimuth adjustment of the magnetic head can be carried out with high precision, and azimuth adjusting error can be minimized greatly in order to meet with the present demands of improving the recording density at extremely slow tape speeds, and to carry out quality recording and reproduction in a super-miniature tape recorder.

The present invention is not limited to the above embodiment but can be modified without departing the scope of the present invention.

As stated hereinbefore, the present invention can provide an azimuth adjusting device for a magnetic head, which device can carry out azimuth adjustment of a magnetic head with high precision by finely adjusting the rotational angle of an adjusting screw.

What is claimed is:

1. In an azimuth adjusting device for a magnetic head, the magnetic head having a center axis, including a head fitting plate for supporting the magnetic head, a support for mounting said head fitting plate so that the magnetic head is in operative relationship with a magnetic tape moving in a first plane substantially perpendicular to the center axis of the magnetic head, and an azimuth adjusting screw arranged for rotation about its axis on said support for adjusting the azimuth of the magnetic head in the first plane, the improvement comprising means on said support for pivoting the head fitting plate about an axis substantially parallel to the center axis of the magnetic head, spring means on said support for applying a bias force to said head fitting plate in a direction substantially parallel to the axis of said azimuth adjusting screw, said azimuth adjusting screw is arranged on said support to apply an azimuth adjusting force to said head fitting plate to counter the bias force applied to said head fitting plate by said spring means so that the azimuth of the magnetic head can be adjusted in accordance with rotational movement of said azimuth adjusting screw, said spring means and said azimuth adjusting screw applying said bias force and said azimuth adjusting force to said head fitting plate at locations along a line substantially perpendicular to the center axis and on different sides of the magnetic head, a first gear wheel of relatively large diameter coaxially fixed to said azimuth adjusting screw, and a second gear wheel mounted on said support in meshed engagement with said first gear wheel for transmitting rotational movement to said azimuth adjusting screw, said second gear wheel having a diameter smaller than that of said first gear wheel so that said azimuth adjusting screw can be finely adjusted to set the azimuth of the magnetic head in the first plane.

2. The improved azimuth adjusting device of claim 1, wherein said pivoting means includes a first pin and a second pin aligned to pivot said head fitting plate at points along a line parallel to the center axis of the magnetic head.

3. The improved azimuth adjusting device of claim 1, wherein said head fitting plate has a pair of throughholes each located on a different side of the magnetic head and along a line substantially perpendicular to the center axis of the magnetic head, said spring means includes a third pin extending from said support through one of said throughholes and a spring coaxially fitted on said third pin, and said azimuth adjusting screw includes a fourth pin extending from said support through the other one of said throughholes, an adjustment screw member in threaded engagement with said fourth pin so that said adjustment screw member moves in the axial direction of said fourth pin when said adjustment screw member is rotated, said first gear wheel is coaxially fixed to said adjustment screw member, and a sleeve coaxially arranged on said fourth pin to transmit said azimuth adjusting force from said adjustment screw member to said head fitting plate.

4. The improved azimuth adjusting device of claim 3, including an azimuth adjusting disk coaxially fixed to said second gear wheel for transmitting rotational movement to said azimuth adjusting screw member through said second and said first gear wheels.

* * * * *